(12) United States Patent
Nakao

(10) Patent No.: US 10,712,823 B2
(45) Date of Patent: Jul. 14, 2020

(54) TACTILE SENSATION PROVIDING APPARATUS

(71) Applicant: KYOCERA Corporation, Kyoto (JP)

(72) Inventor: Fumiaki Nakao, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 20 days.

(21) Appl. No.: 16/071,617

(22) PCT Filed: Jan. 16, 2017

(86) PCT No.: PCT/JP2017/001207
§ 371 (c)(1),
(2) Date: Jul. 20, 2018

(87) PCT Pub. No.: WO2017/130768
PCT Pub. Date: Aug. 3, 2017

(65) Prior Publication Data
US 2019/0033972 A1  Jan. 31, 2019

(30) Foreign Application Priority Data

Jan. 27, 2016  (JP) .................. 2016-013541
Jan. 27, 2016  (JP) .................. 2016-013542

(51) Int. Cl.
G06F 3/041   (2006.01)
G06F 3/01    (2006.01)
G06F 3/0354  (2013.01)

(52) U.S. Cl.
CPC .......... *G06F 3/016* (2013.01); *G06F 3/03547* (2013.01); *G06F 3/041* (2013.01)

(58) Field of Classification Search
None
See application file for complete search history.

(56) References Cited

U.S. PATENT DOCUMENTS

2002/0004423 A1* 1/2002 Minami ............... A63F 13/06
                                                463/38
2012/0299857 A1* 11/2012 Grant .................. G06F 3/016
                                               345/173
2014/0268515 A1* 9/2014 Smoot ................ G06F 3/03546
                                              361/679.01

FOREIGN PATENT DOCUMENTS

JP   2007-034991 A       2/2007
JP   2007034991 A   *    2/2007
JP   4975789 B2          7/2012
WO   2012111351 A1       8/2012

* cited by examiner

Primary Examiner — Dorothy Harris
(74) Attorney, Agent, or Firm — Studebaker & Brackett PC

(57) ABSTRACT

A tactile sensation providing apparatus includes a panel, an actuator configured to vibrate the panel, and an elastic member in contact with the panel. When the actuator vibrates the panel, the elastic member suppresses inhibition of vibration at a position where the panel is pressed.

5 Claims, 11 Drawing Sheets

TACTILE SENSATION PROVIDING APPARATUS

CROSS REFERENCE TO RELATED APPLICATION

This application claims priority to and the benefit of Japanese Patent Application Nos. 2016-013541 and 2016-013542 (both filed on Jan. 27, 2016), the entire contents of which are incorporated herein by reference.

TECHNICAL FIELD

The present disclosure relates to an apparatus for providing a tactile sensation on a panel.

BACKGROUND

Apparatuses for providing a tactile sensation by giving tactile feedback to, for example, a user's fingertip are known. Typical examples of such apparatuses include apparatuses that provide a tactile sensation to a user's fingertip and the like via a touch panel in response to a user operation to the touch panel. Such apparatuses are capable of, in response to a user operation to, for example, a touch panel, informing the user that the apparatus has recognized the user operation by providing a tactile sensation through vibration of the touch panel in contact with the user's fingertip and the like.

SUMMARY

A tactile sensation providing apparatus according to the present disclosure includes a panel, an actuator configured to vibrate the panel, and an elastic member in contact with the panel. When the actuator vibrates the panel, the elastic member suppresses inhibition of vibration at a position where the panel is pressed.

A tactile sensation providing apparatus according to the present disclosure includes a panel, an actuator configured to vibrate the panel, and a weight provided to the panel. When the actuator vibrates the panel, the weight suppresses inhibition of vibration at a position where the panel is pressed.

DETAILED DESCRIPTION

Figure 1:
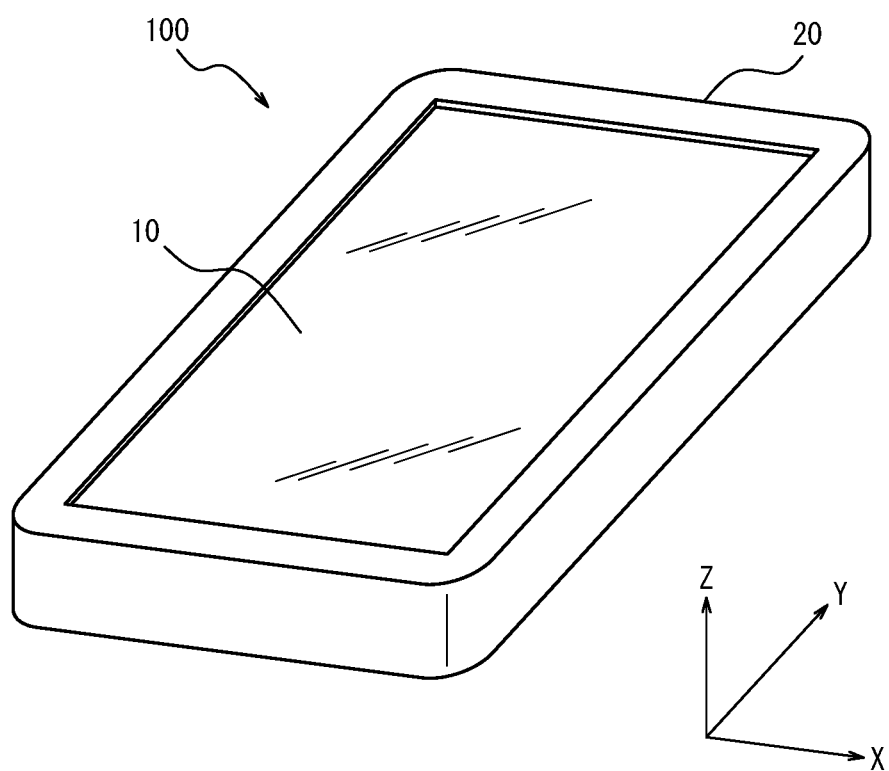
FIG. 1 is a perspective view illustrating an external appearance of a tactile sensation providing apparatus used to explain the principles of embodiments of the present disclosure.

In order to provide a favorable operational feeling to a user from an apparatus operated by the user, technologies for presenting a favorable tactile sensation such as a click sensation acquired by the user when the user presses, for example, a mechanical key or button are desirable.

As for a configuration of such an apparatus, there may be a variety of requirements for, in particular, an installation location of and the number of actuators configured to provide the tactile sensation, in accordance with specifications and various constraints of the apparatus. It would thus be very advantageous if a favorable tactile sensation can be provided without a large number of actuators. A tactile sensation providing apparatuses according to embodiments of the present disclosure are capable of efficiently providing a favorable tactile sensation.

Hereinafter, embodiments of the present disclosure will be described with reference to the accompanying drawings.

In the embodiments described below, as an example of the tactile sensation providing apparatus, an apparatus that provides an operational feeling to a user by providing a tactile sensation on a panel will be described. This apparatus is capable of providing the tactile sensation to the user's fingertip (or a tool such as a stylus pen) in contact with the panel, in response to a user operation to, for example, the panel. When receiving the operational feeling obtained through the tactile sensation at the fingertip or the like, the user may recognize that the apparatus has received an input according to the user operation.

Electronic devices equipped with the tactile sensation providing apparatus may include, for example, mobile phones, smartphones, phablets, and tablet computers. The electronic devices equipped with the tactile sensation providing apparatus are not limited thereto. Electronic devices equipped with the tactile sensation providing apparatus may be any electronic devices having a panel for providing a tactile sensation including, for example, PDAs, remote controls, portable music players, and video game consoles. Electronic devices equipped with the tactile sensation providing apparatus are not limited to these mobile electronic devices. Electronic devices equipped with the tactile sensation providing apparatus are also applicable to any apparatuses with a panel including, for example, desktop computers, ATMs, and ticket vending machines at railway stations.

Electronic devices equipped with a panel may be employed as automotive control panels embedded in the steering of a vehicle, car navigation systems, dashboards, and the like. Electronic devices equipped with a panel may also be employed by vehicles other than automobiles. The electronic devices equipped with a panel may be employed by not only vehicles but also various electronic devices including household appliance.

The tactile sensation providing apparatus according to the present disclosure may be used for, but may not be limited to, an electronic device equipped with a touch sensor. Hereinafter, in order to focus on the provision of the tactile sensation, the tactile sensation providing apparatus according to the present embodiments is described as an apparatus equipped with a panel, omitting descriptions of functions for detecting a contact position by a touch sensor and the like.

First, the principles of the embodiments of the present disclosure will be described. In order to describe the principles of the embodiments of the present disclosure, a tactile sensation providing apparatus conventionally assumed will be described below. FIG. 1 to FIG. 4 are diagrams illustrating the tactile sensation providing apparatus used to describe the principles of the embodiments of the present disclosure.

FIG. 1 is a perspective view illustrating an external appearance of the tactile sensation providing apparatus used to describe the principles of the embodiments of the present disclosure. As illustrated in FIG. 1, the tactile sensation providing apparatus 100 includes a panel 10 and a housing 20. By vibrating the panel 10, the tactile sensation providing apparatus 100 provides a tactile sensation to a user's finger or the like in contact with (or pressing) the panel 10. On the panel 10, the user does not necessarily need to contact or press the panel 10 with the user's finger but may contact or press the panel 10 by using a tool such as a stylus pen. The following description assumes that the user touches or presses the panel 10 with the finger.

The panel 10 equipped with a touch sensor may detect a position of contact by the user on the panel 10. The panel 10 may be equipped with a light-transmitting touch sensor and, on a rear side of the panel 10, a display such as an LCD. The panel 10 configured in this manner may indicate a position where the user needs to contact by displaying an image of an icon and the like on the display. Alternatively, the panel 10 may simply be formed by using a plate member made of metal, glass, plastic, or the like having no function to detect a contact position. Hereinafter, in order to focus on provision of a tactile sensation, functions for position detection and image display will be omitted.

The housing 20 has a function for protecting the tactile sensation providing apparatus 100 in its entirety. Thus, the housing 20 is preferably made of a material with an appropriate strength such as metal or plastic. The housing 20 may be configured as a member for attaching the tactile sensation providing apparatus 100 to another electronic device. The housing 20 may have a function as a bezel for covering a peripheral portion of the panel 10 to prevent disengagement of the panel 10 from the housing 20. The housing 20 is not limited to the configuration illustrated in FIG. 1 but may have various configurations in accordance with specifications of the tactile sensation providing apparatus 100 and various requirements.

As illustrated in FIG. 1, the panel 10 of the tactile sensation providing apparatus 100 has a rectangular shape. A surface of the panel 10 is substantially parallel to an XY plane. The user operating the tactile sensation providing apparatus 100 contacts or presses the surface of the panel 10 in a negative Z-axis direction with a finger.

Figure 2A:
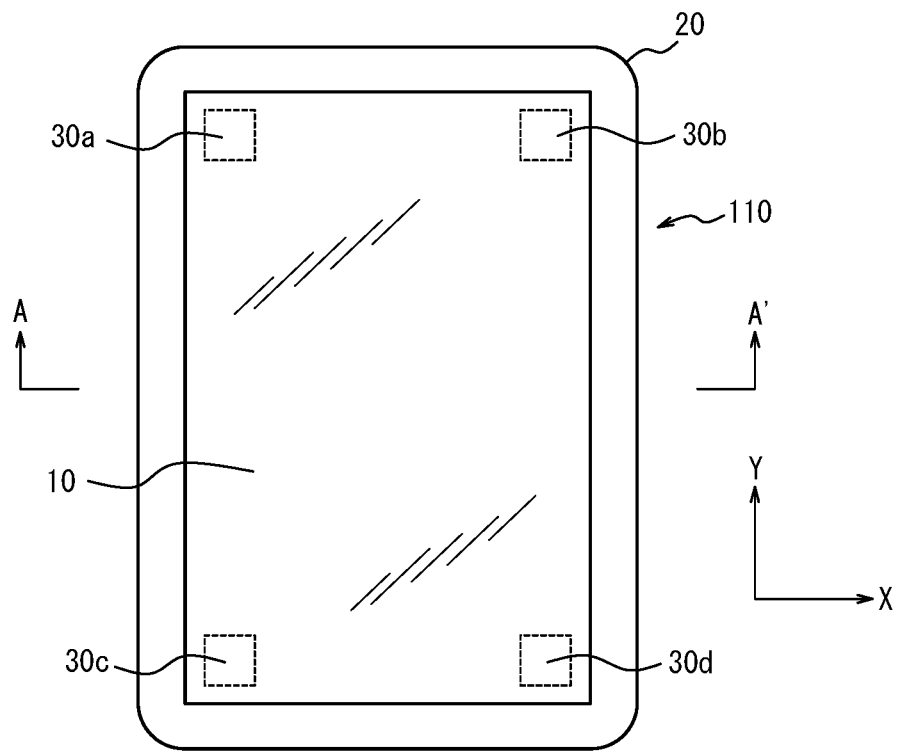
FIGS. 2A and 2B are a front view and a cross-sectional view, respectively, illustrating the external appearance of the tactile sensation providing apparatus used to explain the principles of embodiments of the present disclosure.
Figure 2B:
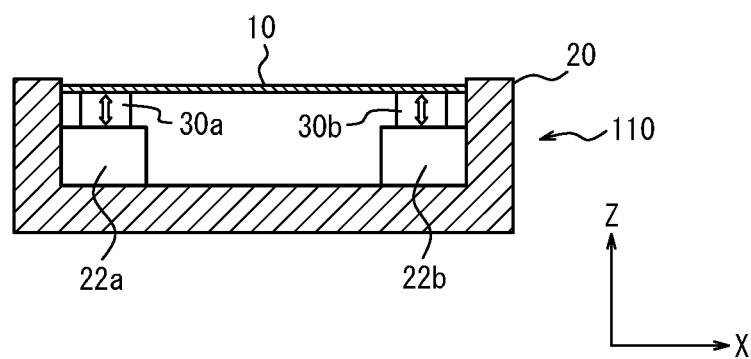

FIGS. 2A and 2B are diagrams illustrating an example (of a tactile sensation providing apparatus 110) in which the tactile sensation providing apparatus 100 illustrated in FIG. 1 is provided with four actuators configured to vibrate the panel 10.

FIG. 2A is a top view of the tactile sensation providing apparatus 110. That is, FIG. 2A is a diagram viewing the tactile sensation providing apparatus 110 in the negative Z-axis direction. As illustrated in FIG. 2A, the tactile sensation providing apparatus 110 is provided with four actuators 30a, 30b, 30c, and 30d at corresponding corners of the panel 10 to vibrate the panel 10. In order to avoid impairing the appearance of the tactile sensation providing apparatus 110, the actuators 30a, 30b, 30c, and 30d are preferably arranged on the rear side of the panel 10 (i.e., the surface of the panel 10 in the negative Z-axis direction). For that reason, the actuators 30a, 30b, 30c, and 30d are indicated by broken lines in FIG. 2A.

The actuators 30a, 30b, 30c, and 30d may be configured with any appropriate member that vibrates the panel 10 by applying a force to the panel 10. Hereinafter, actuators configured with piezoelectric elements will be described as examples of the actuators 30a, 30b, 30c, and 30d.

Upon application of an electric signal (a voltage), the piezoelectric element expands and contracts, or bends, in accordance with an electromechanical coupling coefficient of a material of the piezoelectric element. The piezoelectric element may be formed by using ceramic or quartz. The piezoelectric element used as the actuator may be of, for example, a unimorph type or a bimorph type, or may be a laminated piezoelectric element in which a number of piezoelectric elements are stacked into a stick-like shape. The laminated piezoelectric element includes a laminated bimorph element configured with laminated bimorphs. The laminated piezoelectric element has a laminated structure including a plurality of dielectric layers made of, for example, PZT (lead zirconate titanate) and electrode layers provided between the plurality of dielectric layers. The laminated piezoelectric element is displaced in a thickness direction upon application of an electric signal. Accordingly, the laminated piezoelectric element may be configured to expand and contract in the thickness direction by appropriately adjusting a polarity and the magnitude of the electric signal to be applied. By utilizing the expansion and contraction in the thickness direction, the actuators 30a, 30b, 30c, and 30d configured with the piezoelectric elements may vibrate the panel 10.

FIG. 2B is a cross-sectional view taken from line A-A' of the tactile sensation providing apparatus 110 illustrated in FIG. 2A. As illustrated in FIG. 2B, the actuators 30a and 30b are arranged on the rear surface of the panel 10. In arranging the actuators 30a and 30b to the panel 10, the actuators 30a and 30b are preferably fixedly adhered by appropriately using an adhesive or double-sided tape. When the housing 20 has a function as a bezel for covering the peripheral portion of the panel 10, the actuators 30a and 30b do not need to be adhered to the panel 10.

The actuators 30a and 30b are preferably fixed to the housing 20 as well. In this case, the actuators 30a and 30b may be directly attached to inner walls of the housing 20. However, there may be a case in which the height of the panel 10 in a Z-axis direction is not sufficient for the direct attachment of the actuators 30a and 30b to the inner walls of the housing 20. In this case, as illustrated in FIG. 2B, supports 22a and 22b may be provided to the inner walls of the housing 20, such that the actuator 30a and the actuator 30b are arranged on the support 22a and the support 22b, respectively. When the actuators 30a and 30b are fixed to the housing 20 or the supports 22a and 22b, an adhesive or double-sided tape may be appropriately used.

In FIG. 2B, the arrows in the actuators 30a and 30b represent vibration directions of the actuators 30a and 30b. That is, in the tactile sensation providing apparatus 110, the actuators 30a and 30b vibrate the panel 10 by expanding and contracting in the Z-axis direction.

As illustrated in FIG. 2A, in the tactile sensation providing apparatus 110, the four actuators 30a, 30b, 30c, and 30d configured to vibrate the panel 10 are provided to the four corners of the panel 10. This configuration allows the actuators 30a, 30b, 30c, and 30d to successfully vibrate the panel 10 regardless of a position of contact on the panel 10 by the user. Accordingly, the tactile sensation providing apparatus 110 may provide a favorable tactile sensation to the user's finger or the like.

Depending on the configuration of the tactile sensation providing apparatus, however, there may be a case in which it is difficult to provide an actuator to each of the four corners of the panel 10, unlike the tactile sensation providing apparatus 110 illustrated in FIGS. 2A and 2B. Further, even when an actuator can be provided to each of the four corners of the panel 10, there may be a case in which it is desired to reduce the number of actuators as much as possible, from the viewpoint of reduction in power consumption or production cost. As such, next, a tactile sensation providing apparatuses having fewer actuators will be considered.

Figure 3A:
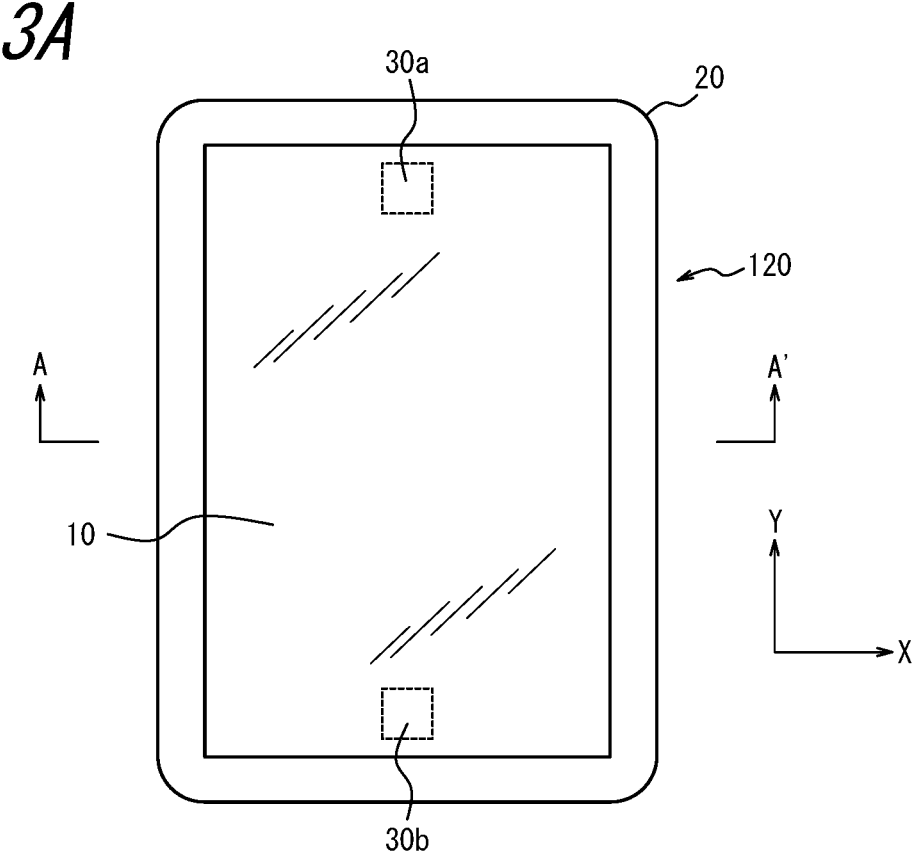
FIG. 3A is a front view of, and FIGS. 3B and 3C are cross-sectional views of the tactile sensation providing apparatus used to explain the principles of embodiments of the present disclosure.
Figure 3B:
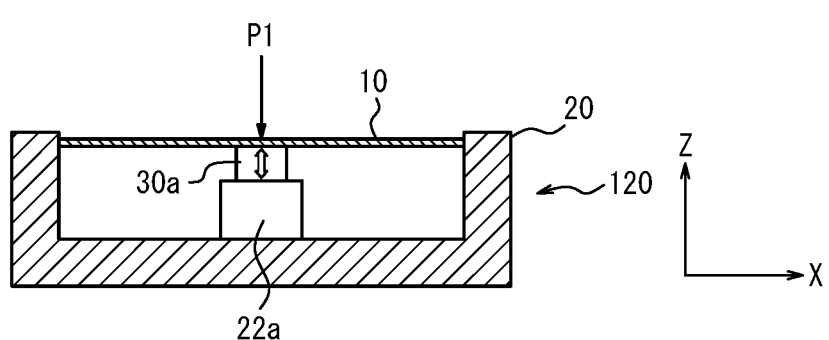
Figure 3C:
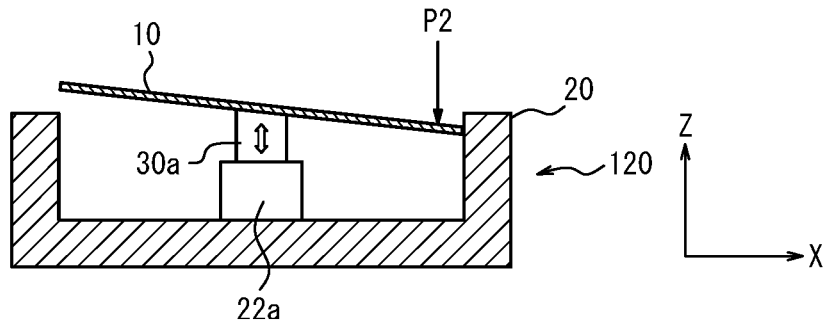

FIGS. 3A, 3B, and 3C are diagrams illustrating an example (of a tactile sensation providing apparatus 120) in which the tactile sensation providing apparatus 100 illustrated FIG. 1 is provided with two actuators configured to vibrate the panel 10.

FIG. 3A is a top view of the tactile sensation providing apparatus 120. That is, FIG. 3A is a diagram viewing the tactile sensation providing apparatus 120 in the negative Z-axis direction. As illustrated in FIG. 3A, the tactile sensation providing apparatus 120 is provided with the actuators 30a and 30b configured to vibrate the panel 10 and arranged in the vicinity of centers of two transverse sides of the panel 10. In order to avoid impairing the appearance of the tactile sensation providing apparatus 120, the actuators 30a and 30b are preferably provided on the rear side of the panel 10 (i.e., the surface of the panel 10 in the negative Z-axis direction). For that reason, the actuators 30a and 30b are indicated by broken lines in FIG. 3A. The actuators 30a and 30b may be the same as those used in the tactile sensation providing apparatus 110 described with reference to FIGS. 2A and 2B.

FIG. 3B is a cross-sectional view taken from line A-A of the tactile sensation providing apparatus 120 illustrated in FIG. 3A. As illustrated in FIG. 3B, the actuators 30a is arranged on the rear surface of the panel 10. The actuator 30a may be provided to the panel 10 in a manner similar to that of the tactile sensation providing apparatus 110 described with reference to FIGS. 2A and 2B.

The actuator 30a may be fixed to the housing 20 in a manner similar to that of the tactile sensation providing apparatus 110 described with reference to FIGS. 2A and 2B. In a case where the height of the panel 10 in the Z-axis direction is not sufficient for the direct attachment of the actuator 30a to the inner wall of the housing 20, a support 22a may be provided to the inner wall of the housing 20 such that the actuator 30a is arranged on the support 22a.

In FIG. 3B, the arrow in the actuator 30a represents the vibration direction of the actuator 30a. That is, in the tactile sensation providing apparatus 120, the actuators 30a vibrates the panel 10 by expanding and contracting in the Z-axis direction.

As illustrated in FIG. 3A, in the tactile sensation providing apparatus 120, the actuators 30a and 30b configured to vibrate the panel 10 are arranged in the vicinity of the centers of the transverse sides of the panel 10. This configuration allows the actuators 30a and 30b to relatively successfully vibrate the panel 10 regardless of a position of contact by the user on the line connecting the actuator 30a and the actuator 30b together on the panel 10. Accordingly, the tactile sensation providing apparatus 120 may provide a favorable tactile sensation to the users finger or the like when the user contacts or presses, for example, a position P1 illustrated in FIG. 3B.

In the tactile sensation providing apparatus 120, however, depending on a position of the contact or pressing on the panel 10 by the user, the actuators 30a and 30b may not successfully vibrate the panel 10. For example, when the user contacts or presses a position outside the line connecting the actuator 30a and the actuator 30b together on the panel 10, the actuators 30a and 30b cannot directly vibrate the position contacted or pressed by the user. For example, when the user contacts or presses a position P2 illustrated in FIG. 3C, the vibration of the actuator 30a is inhibited in the position P2. In this case, a favorable tactile sensation may not be provided to the user's finger or the like. Fundamentally, this problem cannot be solved by providing a support to the housing 20 to prevent excessive depression of the panel 10 or by providing a bezel to prevent the disengagement of the panel 10 from the housing 20.

When the number of actuators arranged is reduced as in the tactile sensation providing apparatus 120 described above, depending on the position where the user contacts or presses on the panel 10, a favorable tactile sensation may not be provided to the users finger or the like. Next, a tactile sensation providing apparatus in which the number of actuators are further reduced will be studied.

Figure 4A:
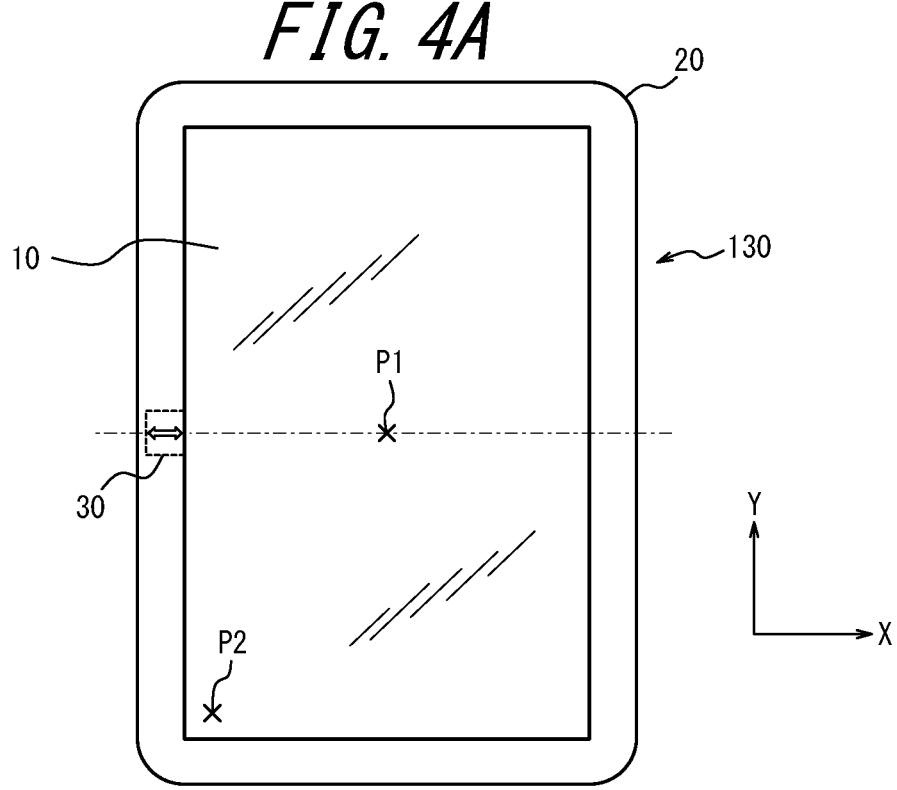
FIGS. 4A and 4B are front views illustrating the external appearance of the tactile sensation providing apparatus used to explain the principles of embodiments of the present disclosure.
Figure 4B:
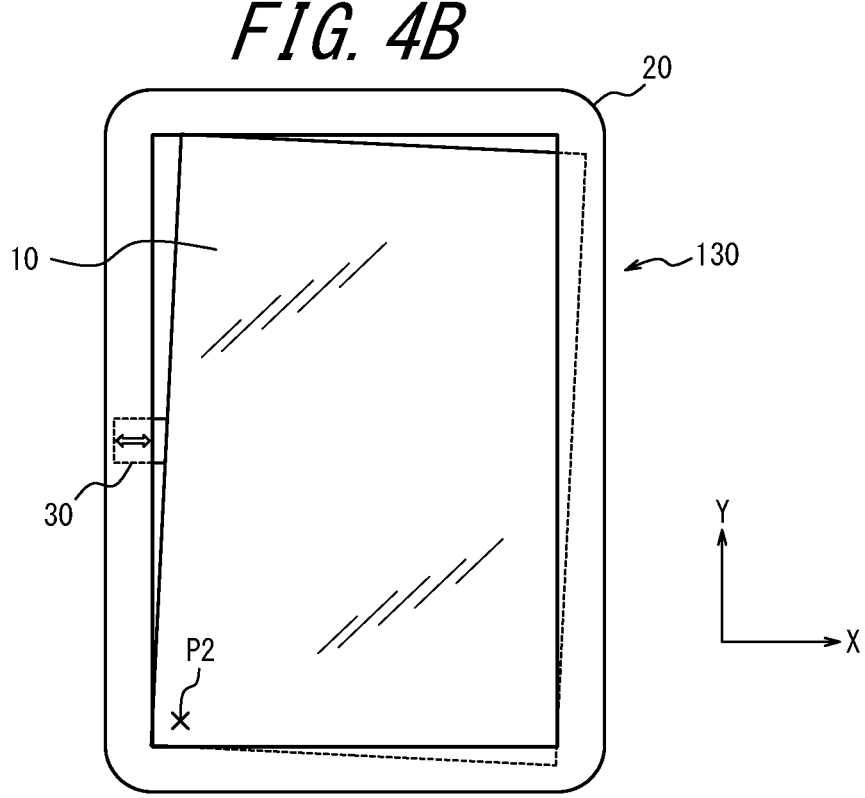

FIGS. 4A and 4B are diagrams illustrating an example (of a tactile sensation providing apparatus 130) in which the tactile sensation providing apparatus 100 illustrated FIG. 1 is provided with one actuator configured to vibrate the panel 10.

FIG. 4A is a top view of the tactile sensation providing apparatus 130. That is, FIG. 4A is a diagram viewing the tactile sensation providing apparatus 120 in the negative Z-axis direction. As illustrated in FIG. 4A, the tactile sensation providing apparatus 130 is provided with an actuator 30 configured to vibrate the panel 10 in the vicinity of the center of one of the longitudinal sides (the left longitudinal side) of the panel 10. In order to avoid impairing the appearance of the tactile sensation providing apparatus 120, the actuator is preferably arranged inside (on the inner wall of) the panel 10. For that reason, the actuator 30 is indicated by broken lines in FIG. 4A.

Although the actuator 30 may be similar to the actuator used in the tactile sensation providing apparatus 110 described with reference to FIGS. 2A and 2B, the actuator 30 is arranged in a different direction. In FIG. 4A, the arrow in the actuator 30 represents the vibration direction of the actuator 30. That is, in the tactile sensation providing apparatus 130, the actuator 30 vibrates the panel 10 in an X-axis direction by expanding and contracting in the X direction. Thus, the actuator 30 is preferably fixed laterally to the panel 10 viewed from a front side of the panel 10. FIG. 4A illustrates an example in which the right-side end (in the positive X-axis direction) of the actuator 30 is adhered to the central portion of the left longitudinal side (in the negative X-axis direction) of the panel 10. When providing the actuator 30 to the panel 10, the actuator 30 is preferably fixed by appropriately using, for example, an adhesive or double-sided tape.

The actuator 30 is preferably fixed to the housing 20 as well. In this case, the actuator 30 may be directly attached to the inner wall of the housing 20 or may be arranged on a support provided to the inner wall of the housing 20. FIG. 4A illustrates an example in which the left-side end (in the negative X-axis direction) of the actuator 30 is adhered to the inner wall of the housing 20.

In the tactile sensation providing apparatus 110 described with reference to FIGS. 2A and 2B and the tactile sensation providing apparatus 120 described with reference to FIGS. 3A to 3C, the actuators 30 vibrate the panel 10 in the Z-axis direction by expanding and contracting in the Z-axis direction. Hereinafter, such vibration of the panel 10 in the Z-axis direction will be referred to as "longitudinal vibration", as appropriate. On the other hand, in the tactile sensation providing apparatus 130 described with reference to FIGS. 4A and 4B, the actuator 30 vibrates the panel 10 in a direction orthogonal to the Z-axis direction by expanding and contracting in the direction orthogonal to the Z-axis direction. Hereinafter, such vibration of the panel 10 in the direction orthogonal to the Z-axis direction will be referred to as "transverse vibration", as appropriate.

As described above, in the tactile sensation providing apparatus 130 illustrated in FIGS. 4A and 4B, when the user's finger or the like is not contacting or pressing the panel 10, the actuator 30 may cause the horizontal vibration of the panel 10 in its entirety.

Here, a user operation to contact or press the surface of the panel 10 includes a longitudinal direction (the Z-axis direction) component with respect to the surface of the panel 10. On the other hand, the expansion and contraction of the actuator 30 to vibrate the panel 10 corresponds to an action to shift the panel 10 in the transverse direction (the X-axis direction) with respect to the surface of the panel 10. In the tactile sensation providing apparatus 130, that is, the direction of the user operation for contacting or pressing the panel 10 and a vibration direction of the panel 10 differ from each other.

However, the applicant has confirmed through experiments that, when the tactile sensation is provided through a vibration in the transverse direction (the X-axis direction) with respect to the surface of the panel 10, most people are under the misapprehension that the tactile sensation is provided in an operation direction (i.e., the Z-axis direction). That is, even when the tactile sensation is provided by vibrating the panel 10 in the direction (the X-axis direction) perpendicular to the pressing direction (the Z-axis direction) by the user, the user can be made to feel a depression together with a click sensation in the pressing direction (the Z-axis direction) by the user. The same applies to when the user releases the pressure. That is, the tactile sensation provided by vibrating the panel 10 in the direction (the X-axis direction) perpendicular to the pressing direction (the Z-axis direction) by the user may make the user feel as if the panel 10 is restoring in a pressure-releasing direction (the Z-axis direction) by the user.

As described above, the tactile sensation providing apparatus 130 is capable of providing an operational feeling in the pressing direction by the user on the surface of the panel 10 by appropriately adjusting a voltage to drive the actuator 30, a displacement amount (amplitude of curvature), and a frequency. In the present specification, detailed descriptions of a power supply for driving the actuator and a controller configured to control the driving of the actuator will be omitted. The power supply for driving the actuator may be implemented by a built-in battery or an external power source. Also, the controller configured to control the driving may be implemented by various processors such as a CPU.

In the tactile sensation providing apparatus 130, however, depending on a position of the contact or pressing on the panel 10 by the user, the actuator 30 may not be able to successfully vibrate the panel 10. The following is a description of the tactile sensation provided by the tactile sensation providing apparatus 130 when the user contacts or presses the panel 10.

In the tactile sensation providing apparatus 130, as illustrated in FIGS. 4A and 4B, the actuator 30 configured to vibrate the panel 10 is arranged in the vicinity of the center of one of the longitudinal sides of the panel 10. This configuration enables, in the tactile sensation providing apparatus 130, the actuator 30 to relatively successively cause the transverse vibration of the panel 10 regardless of a position of the contact or pressing by the user on an extended line, which extends from a point of action of a force by the actuator 30 in an acting direction of the force, on the panel 10. Thus, when the user contacts or presses, for example, a position P1 illustrated in FIG. 4A, the tactile sensation providing apparatus 130 may provide a favorable tactile sensation to the users finger or the like. In FIG. 4A, the extended line in the acting direction of the force including the point of action of the force by the actuator 30 is indicated by a dashed line.

However, for example, when the user contacts or presses a position on the panel 10 outside the extended line extending from the point of action of the force by the actuator 30 in the acting direction of the force, the actuator 30 may not be able to directly deliver the vibration to the contact or pressing position of the user. In FIG. 4A, that is, when a position outside the dashed line on the panel 10 is contacted or pressed, the actuator 30 may not be able to provide a favorable tactile sensation.

For example, when the user contacts or presses a position P2 illustrated in FIG. 4A, the panel 10 shifts including a rotational movement component caused by the contact or the pressing by the user as illustrated in FIG. 4B. In the position P2, thus, the transverse vibration of the actuator 30 is inhibited by the rotational movement component of the panel 10. In this case, a favorable tactile sensation is not provided to the users finger or the like. FIG. 4B illustrates a state in which a part of the panel 10 shifts into the housing 20 due to the shift of the panel 10 including the rotational movement component. In FIG. 4B, the part of the panel 10 which has shifted into the housing 20 is indicated by the broken lines.

Based on the study described above, in each of the embodiments of the present disclosure, a favorable tactile sensation is efficiently provided by providing an elastic member for suppressing inhibition of the vibration at a pressed position on the panel 10. Hereinafter, embodiments of the present disclosure will be described.

First Embodiment

Figure 5A:
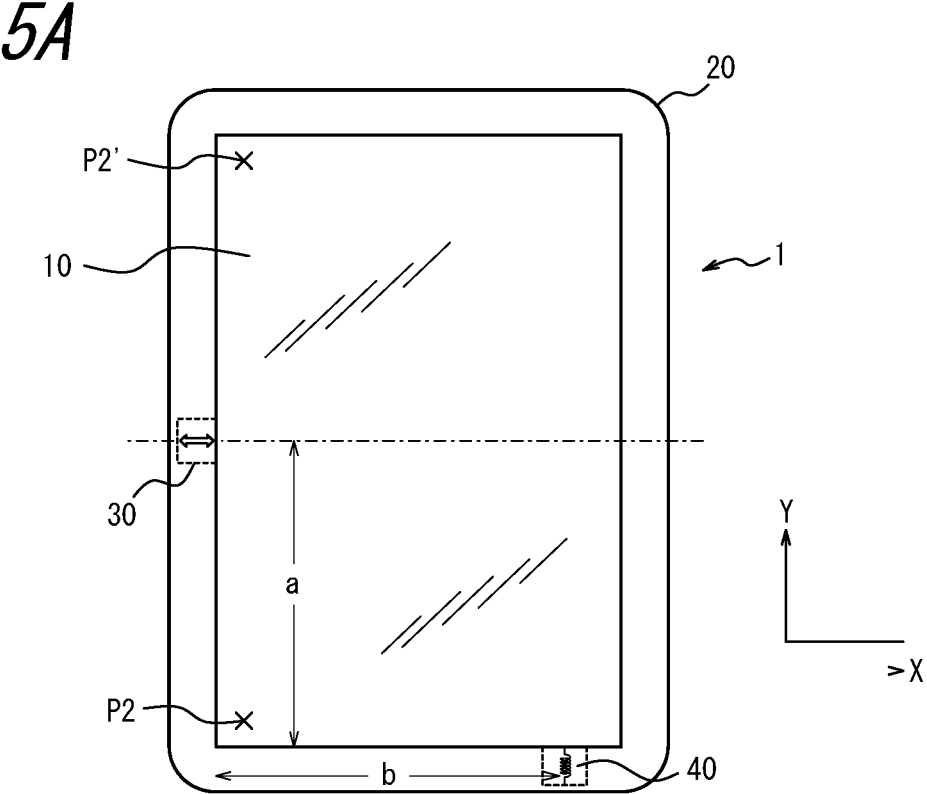
FIGS. 5A and 5B are diagrams illustrating operation of a tactile sensation providing apparatus according to a first embodiment.
Figure 5B:
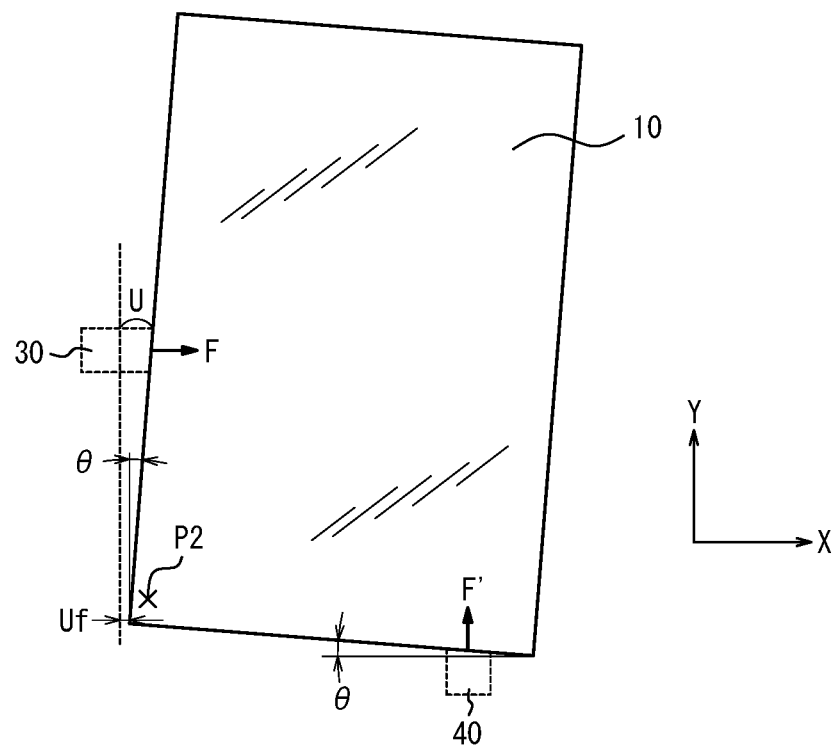

FIGS. 5A and 5B are diagrams illustrating operation of a tactile sensation providing apparatus according to a first embodiment of the present disclosure.

FIG. 5A is a top view of the tactile sensation providing apparatus 1. That is, FIG. 5A is a diagram of the tactile sensation providing apparatus 1 viewed in the negative Z-axis direction. As illustrated in FIG. 5A, the tactile sensation providing apparatus 1 according to the first embodiment of the present disclosure includes the panel 10 and the actuator 30 configured to vibrate the panel 10, as with the tactile sensation providing apparatus 130 described with reference to FIGS. 4A and 4B. Also, the housing 20 may be configured substantially similarly to the housing 20 of the tactile sensation providing apparatus 130 described with reference to FIGS. 4A and 4B. Hereinafter, the same descriptions as those of the tactile sensation providing apparatus 130 described with reference to FIGS. 4A and 4B will be appropriately simplified or omitted, focusing on features specific to the tactile sensation providing apparatus 1 according to the first embodiment.

As illustrated in FIG. 5A, the tactile sensation providing apparatus 1 according to the first embodiment of the present disclosure is implemented by providing an elastic member 40 to the tactile sensation providing apparatus 130 illustrated in FIGS. 4A and 4B. As illustrated in FIG. 5A, the elastic member 40 has one end in contact with the panel 10. The elastic member 40 may be, for example, a small spring. The elastic member 40 may be formed by using any material with an appropriate elastic force. For example, the elastic member 40 may be made of a material including rubber such as silicone rubber or urethane. The elastic member 40 is not limited to the spring shape as illustrated in FIG. 5A but may take any shape including a leaf spring, so long as being formed by using a member with an appropriate elastic force. Here, the elastic member 40 is assumed to generate a contracting force when being expanded and an expanding force when being contracted. Preferably, the elastic member 40 generates a restoring force when being expanded or contracted upon application of a force in an elastic deformation direction, i.e., an expansion/contraction direction, and is readily deformed upon application of a force in a direction orthogonal to the elastic deformation direction in accordance with the magnitude of the force.

The contact between the elastic member 40 and the panel 10 may take various configurations in accordance with the shapes of the panel 10 and the elastic member 40. For example, an opening is formed in a portion of the panel 10 or an extended portion of the panel 10 to accommodate one end of the spring of the elastic member 40. Alternatively, for example, the elastic member 40 may be adhered to the panel 10. As illustrated in FIG. 5A, the other end of the elastic member 40 is in contact with the housing 20. In a manner similar to the arrangement of the actuator 30 inside (on the inner wall of) the housing 20, the elastic member 40 is preferably in contact with the inside (on the inner wall) of the housing 20. Similarly to the contact between the elastic member 40 and the panel 10, the contact between the elastic member 40 and the housing 20 may take various manners.

According to the present embodiment, the elastic member 40 suppresses inhabitation of the vibration in the pressing position on the panel 10 when the actuator 30 vibrates the panel 10. In the tactile sensation providing apparatus 1, as mentioned above, when the panel 10 is not pressed by the user's finger or the like, there is substantially no element that inhibits the vibration of the panel 10. In the tactile sensation providing apparatus 1, thus, when the panel 10 is not pressed, the actuator 30 may vibrate the panel 10 by causing a translational motion of the panel 10. Here, the translational motion of the panel 10 means displacement of the panel 10 in its entirety parallel to the X-axis without any change of direction. On the other hand, when the user contacts or presses the panel 10, because the panel 10 attempts to shift with a rotational movement component, suppression of the vibration at the contact/pressing position on the panel 10 is possible. As such, the tactile sensation providing apparatus 1 according to the present embodiment suppresses inhibition of the vibration of the panel 10 by using the elastic member 40 to reduce the rotational movement component of the panel 10. Especially in the configuration in which the panel 10 transversely vibrates such as the configuration of the tactile sensation providing apparatus 1, the elastic member 40 suppresses inhibition of the vibration by reducing the rotational movement component about an axis normal to the panel 10.

In the tactile sensation providing apparatus 1, as illustrated in FIG. 5A, similarly to the tactile sensation providing apparatus 130 described with reference to FIGS. 4A and 4B, the actuator 30 configured to vibrate the panel 10 is arranged in the vicinity of the center of one of the longitudinal sides (the left longitudinal side) of the panel 10. In this configuration, when the user presses a position P2 illustrated in FIG. 5A, the panel 10 moves not only with translational motion in the X-axis direction, but also with a rotational motion component about the normal direction of the panel 10, i.e., the Z-axis. FIG. 5B is a diagram illustrating a state in which the panel 10 of FIG. 5A shifts with the rotational motion component. Note that the shift of the panel 10 is slightly exaggerated in FIG. 5B for the purpose of explanation, and does not reflect an actual shift amount.

As illustrated in FIG. 5B, when the actuator 30 is driven and expands in the positive X-axis direction, a force F is applied to the panel 10. The application of the force F causes the translational movement of the panel 10 in the positive X-axis direction. When the actuator 30 expands in the positive X-axis direction while the position P2 is pressed on the panel 10, the panel 10 shifts with the rotational movement component in the clockwise direction as illustrated in FIG. 5B. Due to the rotational movement component in the clockwise direction, the panel 10 generates a force pressing the elastic member 40 in a negative Y-axis direction at the position of the elastic member 40. According to the present embodiment, thus, the elastic force of the panel 10 counteracts by generating a force to press the panel 10 in a positive Y-axis direction. In this manner, the elastic member 40 according to the present embodiment suppresses the inhibition of the vibration by suppressing inhibition of the translational motion of the panel 10. To that end, the elastic member 40 is preferably arranged in a position where the elastic member 40 may reduce the rotational motion component of the panel 10, typically in the position of the elastic member 40 illustrated in FIGS. 5A and 5B.

Next, preferable positions to arrange the actuator 30 and the elastic member 40 according to the present embodiment will be further described.

As illustrated in FIG. 5A, distance a represents a distance between the position of the actuator 30 provided to the panel 10 and the position P2 pressed on the panel 10. As illustrated in FIG. 5A, also, distance b represents a distance between the position of the elastic member 40 provided to the panel 10 and the position P2 pressed on the panel 10. As illustrated in FIG. 5B, further, F represents the magnitude of the force acting in the positive X-axis direction applied to the panel 10 by the actuator 30, and F' represents the magnitude of the force acting in the negative Y-axis direction applied to the elastic member 40 by the panel 10 caused by the force F. A relationship of these elements may be expressed as the moment of force by the following formula 1.

[Formula 1]

$$aF = bF' \quad (1)$$

When θ represents an angle of rotational displacement of the panel 10 caused by the force F applied to the panel 10 by the actuator 30, b sin θ represents a displacement amount of the panel 10 in the Y-axis direction from the position of the elastic member 40 caused by the rotation. When the elastic member 40 is displaced by the panel 10 by the displacement amount b sin θ in the Y-axis direction, the magnitude of the reaction force F generated by the elastic force of the elastic member 40 may be expressed by the following formula (2) based on the Hooke's law, provided that K represents a spring constant of the elastic member 40.

[Formula 2]

$$F' = K \cdot b \sin \theta \quad (2)$$

As illustrated in FIG. 5B, further, U represents the displacement amount of the actuator 30 expanding in the positive X-axis direction when driven. As described above, when the actuator 30 is driven and expands in the positive X-axis direction, the panel 10 moves with translational motion in the positive X-axis direction and, also, shifts with a rotational motion component about the Z-axis. As illustrated in FIG. 5B, Uf represents a displacement amount of the position P2 on the panel 10 in the positive X-axis direction caused by the expansion of the actuator 30. As illustrated in FIG. 5B, also, when θ represents the angle of rotational displacement of the panel 10, a sin θ represents a displacement amount of the panel 10 in the X-axis direction from the position of the actuator 30 caused by the rotation. Thus, a relation between Uf and U may be expressed by the following formula (3).

[Formula 3]

$$UF = U - \alpha \sin \theta \quad (3)$$

Here, removing θ and F' from the above formula (3) by using the above formulas (1) and (2) yields the following formula (4).

[Formula 4]

$$Uf = U - \left(\frac{a}{b}\right)^2 \cdot \frac{F}{K} \quad (4)$$

In the above formula, U represents an expansion amount of the actuator 30, and Uf represents the displacement amount of the position P2 on the panel 10. Thus, as a value of Uf approaches U, the displacement in the positive X-axis direction becomes less attenuated, and the tactile sensation may be efficiently provided.

In order to bring Uf closer to U in the above formula (4), a value to be subtracted from U is reduced. That is, it is understood that in order to bring Uf closer to U, a/b is may be brought closer to 0. As illustrated in FIG. 5A, the distance a represents the distance between the point of action of the force caused by the actuator 30 and a center of the rotational motion of the panel 10. Also, the distance b represents the distance between a contact position of the elastic member 40 in respect of the panel 10 and the center of the rotational motion of the panel 10. In order to bring a/b closer to zero, the distance b is set to be greater than the distance a, or the distance a is set to be smaller than the distance b in FIG. 5A. For example, when the distance b is set to be twice the length of the distance a, an attenuation degree of the vibration in the X-axis direction in the position P when the panel 10 vibrates may be reduced to ¼ or less. As described above, the tactile sensation providing apparatus 1 according to the present embodiment is preferably configured such that the distance a is smaller than the distance b, or the distance b is greater than the distance a. In this way, the tactile sensation providing apparatus 1 according to the present embodiment is capable of efficiently providing a favorable tactile sensation even when a small number of actuators are provided thereto.

Second Embodiment

Figure 6:
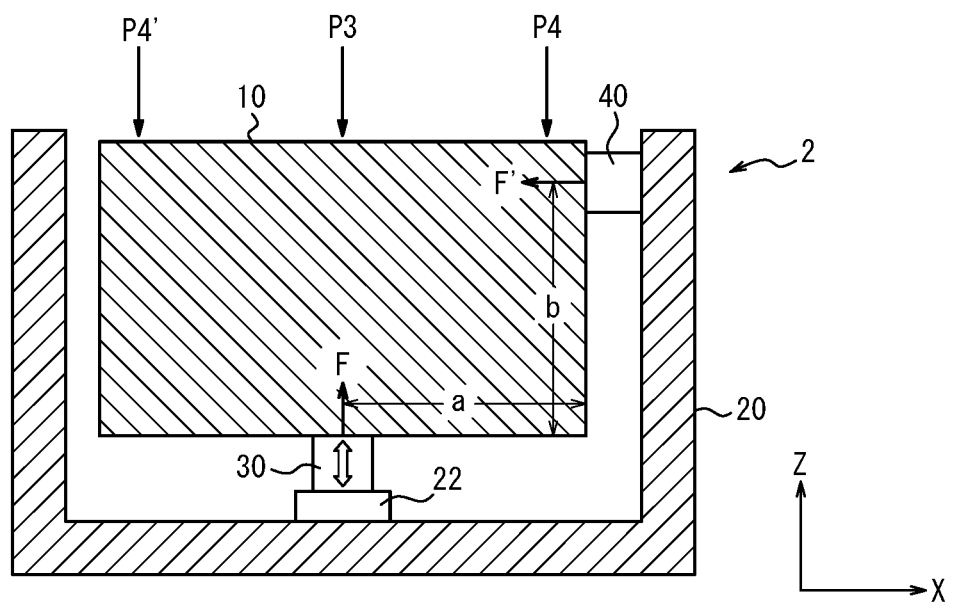
FIG. 6 is a diagram illustrating operation of a tactile sensation providing apparatus according to a second embodiment.

FIG. 6 is a diagram illustrating operation of a tactile sensation providing apparatus according to a second embodiment. FIG. 6 illustrates a cross-sectional view of the tactile sensation providing apparatus according to the second embodiment (see FIGS. 3B and 3C).

The tactile sensation providing apparatus 1 according to the first embodiment described above causes transverse vibration of the panel 10. The tactile sensation providing apparatus 2 according to the second embodiment causes longitudinal vibration of the panel 10. To the tactile sensation providing apparatus 2 according to the second embodiment that causes the longitudinal vibration of the panel 10, the same principle as that of the transverse vibration of the panel 10 described in the first embodiment also applies.

When the elastic member 40 illustrated in FIG. 6 is not provided, the vibration of the actuator 30 is inhibited, depending on a contact/pressing position of the user on the panel 10, as described with reference to FIG. 3C. In this case, a favorable tactile sensation may not be provided to the user's finger or the like. For example, when the user contacts or presses a position P3 illustrated in FIG. 6, the actuator 30 may directly vibrate the contact/pressing position of the user, successfully proving a favorable tactile sensation. On the other hand, when the user contacts or presses a position P4 illustrated in FIG. 6, the actuator 30 is unable to directly vibrate the contact/pressing position of the user, thus failing to provide a favorable tactile sensation.

In the configuration illustrated in FIG. 6, when the actuator 30 expands in the positive Z-axis direction while the position P4 is being pressed, the panel 10 moves in translational motion in the positive Z-axis direction and, also, shifts with a rotational motion component about the Y-axis. As such, the tactile sensation providing apparatus 2 according to the present embodiment is provided with the elastic member 40 as illustrated in FIG. 6 that suppresses inhibition of the vibration of the panel 10 by reducing the rotational motion component of the panel 10.

In the tactile sensation providing apparatus 2, when the actuator 30 is driven and expands in the positive Z-axis direction, the force F is applied to the panel 10. The application of the force F causes the translational movement of the panel 10 in the positive Z-axis direction. When the actuator 30 expands in the positive Z-axis direction while the position P4 is pressed on the panel 10, the panel 10 shifts with a clockwise rotational motion component about the Y-axis. This clockwise rotational motion component causes a force of the panel 10 to press the elastic member 40 in the positive X-axis direction at the position of the elastic member 40. According to the present embodiment, as such, the elastic force of the elastic member 40 is utilized to generate a force F for pressing the panel 10 in the negative X-axis direction. In this way, according to the present embodiment also, the elastic member 40 suppresses inhibition of the vibration by reducing the inhibition of the translational movement of the panel 10. To that end, the elastic member 40 is preferably positioned in a position where the elastic member 40 may reduce the rotational motion component of the panel 10, typically in the position of the elastic member 40 illustrated in FIG. 6. According to the present embodiment, as described above, the elastic member 40 suppresses the inhibition of the vibration by reducing the rotational motion component to rotate about a line (e.g., the Y-axis) orthogonal to the normal of the panel 10.

In the tactile sensation providing apparatus 2, as described above, when the actuator 30 expands in the positive Z-axis direction while the position P4 is being pressed, the panel 10 shifts with the clockwise rotational motion component about the Y-axis. The clockwise rotational motion component causes a force of the panel 10 to press the elastic member 40 in the positive X-axis direction at the position of the elastic member 40. As such, the elastic member 40 reduces the rotational motion component of the panel 10 by generating the force F for pressing the panel 10 in the negative X-axis direction. In the tactile sensation providing apparatus 2, on the other hand, when the actuator 30 expands in the positive Z-axis direction while a position P4' is being pressed, the panel 10 shifts with a counterclockwise rotational motion about the Y-axis. The counterclockwise rotational motion component causes a force of the panel 10 to pull the elastic member 40 in the negative X-axis direction at the position of the elastic member 40. Consequently, the elastic member 40 may reduce the rotational motion component of the panel 10 by generating a force for restoring the panel 10 in the positive X-axis direction.

Further, the tactile sensation providing apparatus 2 is preferably configured such that the distance a is smaller than the distance b, or the distance b is greater than the distance a, as illustrated in FIG. 6. As described above, the tactile sensation providing apparatus 2 according to the present embodiment may efficiently provide a favorable tactile sensation even when a small number of actuators are provided thereto.

Third to Fifth Embodiments

Figure 7A:
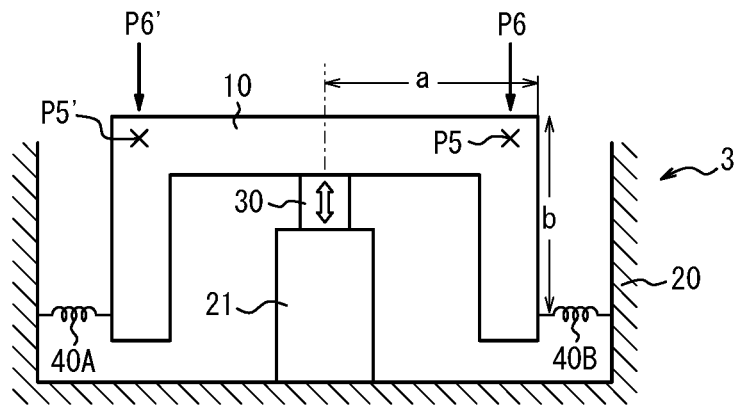
FIG. 7A, FIG. 7B, and FIG. 7C are diagrams respectively illustrating operation of a tactile sensation providing apparatus according to a third embodiment, operation of a tactile sensation providing apparatus according to a fourth embodiment, and operation of a tactile sensation providing apparatus according to a fifth embodiment.
Figure 7B:
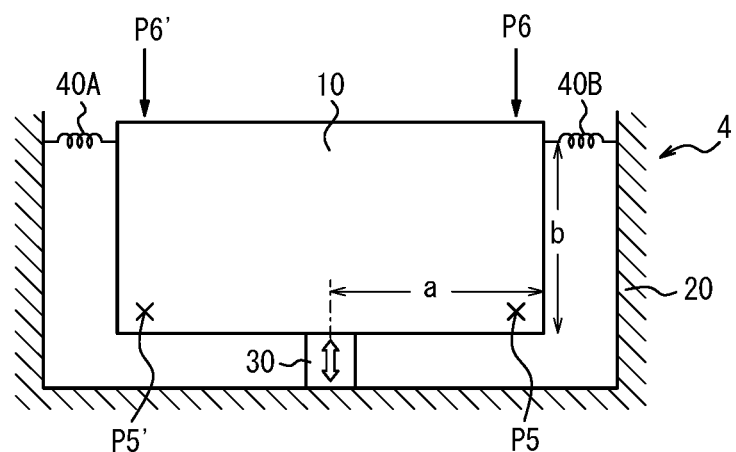
Figure 7C:
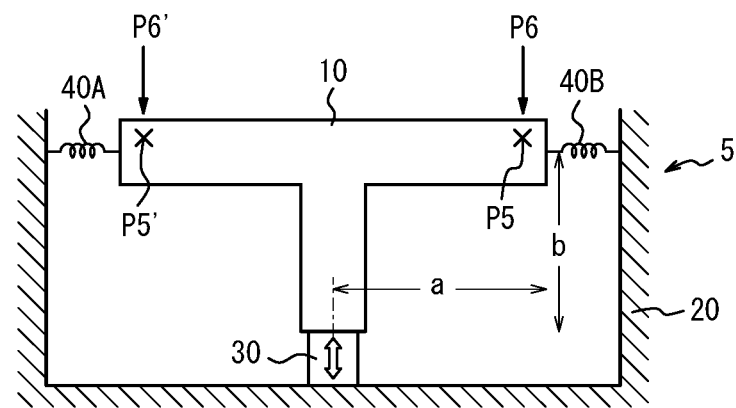

FIGS. 7A to 7C are diagrams illustrating operation of the tactile sensation providing apparatuses according to third to fifth embodiments. FIG. 7A, FIG. 7B, and FIG. 7C are diagrams respectively illustrating the tactile sensation providing apparatuses 3 according to the third embodiment, the tactile sensation providing apparatuses 4 according to the fourth embodiment, and the tactile sensation providing apparatus 5 according to the fifth embodiment.

To the tactile sensation providing apparatuses 3 to 5 according to the third to fifth embodiments illustrated in FIGS. 7A to 7C, the principle similar to that of the tactile sensation providing apparatus 2 according to the second embodiment described with reference to FIG. 6 also applies. Hereinafter, the same descriptions as those of the tactile sensation providing apparatus 2 described with reference to FIG. 6 will be appropriately simplified or omitted. First, a case in which the panel 10 transversely vibrates in the tactile sensation providing apparatuses 3 to 5 illustrated in FIGS. 7A to 7C will be described.

In the configurations as illustrated in FIGS. 7A to 7C, when the actuator 30 expands while a position P6 is being pressed, the panel 10 moves in translational motion in the expansion direction of the actuator 30 and, also, shifts with the rotational motion component. According to the tactile sensation providing apparatuses 3 to 5, as such, elastic members 40 are arranged as illustrated in FIGS. 7A to 7C to suppress inhibition of the vibration of the panel 10 by reducing the rotational motion component of the panel 10.

Also, similarly to the tactile sensation providing apparatus 2 illustrated in FIG. 6, in the tactile sensation providing apparatuses 3 to 5 illustrated in FIGS. 7A to 7C, when a position P6' is pressed, the elastic members 40 suppress inhibition of the vibration of the panel 10 by reducing the rotational motion component of the panel 10. In the tactile sensation providing apparatuses 3 to 5 illustrated in FIGS. 7A to 7C, the elastic members 40A and 40B are in contact with the panel 10. However, similarly to the tactile sensation providing apparatus 2 illustrated in FIG. 6, the tactile sensation providing apparatuses 3 to 5 provided with only one of the elastic member 40A and the elastic member 40B may suppress the inhibition of the vibration of the panel 10 by reducing the rotational motion component of the panel 10.

The tactile sensation providing apparatuses 3 to 5 having the panel 10 that longitudinally vibrates have been described above. However, the tactile sensation providing apparatus 3 to 5 may operate in a similar manner when the panel 10 transversely vibrates similarly to that of the tactile sensation providing apparatus 1 according to the first embodiment. In the configurations as illustrated in FIGS. 7A to 7C, when the actuator 30 expands while a position P5 is being pressed, the panel 10 moves in translational motion in the expansion direction of the actuator 30 and, also, shifts with the rotational motion component. As such, the tactile sensation providing apparatuses 3 to 5 are provided with the elastic members 40 and thus may suppress the inhibition of the vibration of the panel 10 by reducing the rotational motion component of the panel 10. Also, when a position P5' illustrated in FIGS. 7A to 7C is pressed, the elastic member 40 may suppress inhibition of the vibration of the panel 10 by reducing the rotational motion component of the panel 10.

Further, the tactile sensation providing apparatuses 3 to 5 are preferably configured such that the distance a is smaller than the distance b, or such that the distance b is greater than the distance a. As described above, the tactile sensation providing apparatuses 3 to 5 according to the present embodiments may efficiently provide a favorable tactile sensation even when a small number of actuators are provided thereto.

Further, based on the considerations described above, a favorable tactile sensation may be efficiently provided by providing a weight for suppressing the inhibition of the vibration in a pressed position on the panel 10 in each of the embodiments of the present disclosure. Such embodiments will be described hereinafter.

Sixth Embodiment

Figure 8A:
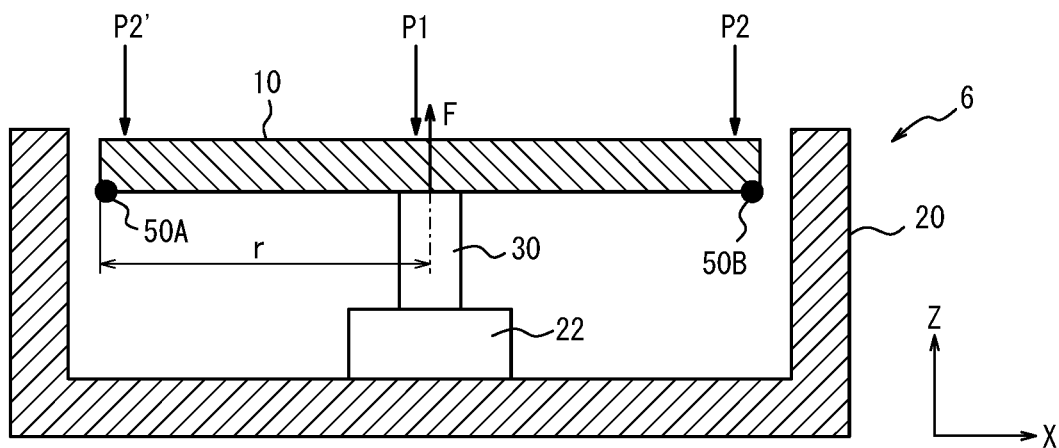
FIGS. 8A and 8B are diagrams illustrating operation of a tactile sensation providing apparatus according to a sixth embodiment.
Figure 8B:
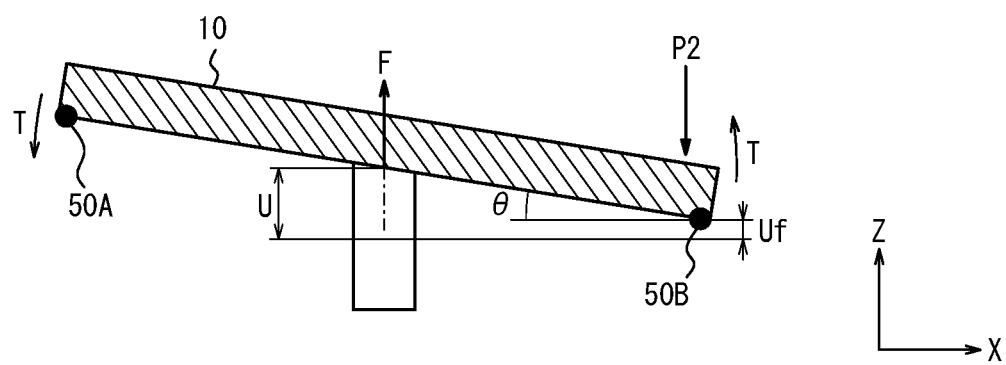

FIGS. 8A and 8B are diagrams illustrating operation of a tactile sensation providing apparatus according to a sixth embodiment of the present disclosure.

FIG. 8A is a cross-sectional view of the tactile sensation providing apparatus 6. That is, FIG. 8A is a diagram of the tactile sensation providing apparatus 6 viewed in the positive Y-axis direction. As illustrated in FIG. 8A, the tactile sensation providing apparatus 6 according to the sixth embodiment of the present disclosure includes the panel 10 and the actuator 30 configured to vibrate the panel 10, as with the tactile sensation providing apparatus 120 described with reference to FIGS. 3A to 3C. Also, the housing 20 may be configured substantially the same as the housing 20 of the tactile sensation providing apparatus 120 described with reference to FIGS. 3A to 3C. Hereinafter, the same descriptions as those of the tactile sensation providing apparatus 120 described with reference to FIGS. 3A to 3C will be appropriately simplified or omitted, focusing on features specific to the tactile sensation providing apparatus 6 according to the sixth embodiment.

As illustrated in FIG. 8A, the tactile sensation providing apparatus 6 according to the sixth embodiment of the present disclosure is implemented by further providing a weight 50 to the tactile sensation providing apparatus 120 illustrated in FIGS. 3A to 3B. In the example illustrated in FIG. 8A, a weight 50A and a weight 50B are provided at either end of the panel 10 in the X-axis direction. The weights 50A and 50B may be formed by using any material having a mass capable of functioning as a weight but are preferably made of a material enabling a relatively small size and a relatively heavy weight. For example, the weights 50A and 50B may be made of metal with a relatively high density such as lead (Pb) or silver (Ag).

In FIG. 8A, the weights 50A and 50B may be provided in the vicinity of either end of one of the transverse sides of the panel 10 illustrated in FIGS. 3A to 3C or in the vicinity of either end of the transverse sides, i.e., the four corners of the panel 10. Alternatively, the weights 50A and 50B may each have an elongated shape such as a columnar shape and may be arranged along the longitudinal sides of the panel 10 illustrated in FIGS. 3A to 3C. The weights 50A and 50B are not limited to the spherical shape, a disk-like shape, or the columnar shape but may take any shape so far as being capable of functioning as weights.

In providing the weights 50A and 50B to the panel 10, the weights 50A and 50b may be fixedly adhered to the panel 10 by appropriately using an adhesive or double-sided tape. Alternatively, accommodation sections may be formed on the panel 10 to accommodate the weights 50A and 50B in embedded manner. In order to avoid impairing the appearance of the tactile sensation providing apparatus 6, the weights 50A and 50B are arranged on the rear surface of the panel 10 (i.e., the surface of the panel 10 in the negative Z-axis direction) in FIG. 8A.

According to the present embodiment, the weights 50A and 50B suppress inhibition of the vibration at the pressing position on the panel 10 when the actuator 30 vibrates the panel 10. In the tactile sensation providing apparatus 1, as mentioned above, when the panel 10 is not pressed by the user's finger or the like, there is practically no element that inhibits the vibration of the panel 10. In the tactile sensation providing apparatus 6, thus, when the panel 10 is not pressed, the actuator 30 may vibrate the panel 10 by causing the translational motion of the panel 10. Here, the translational motion of the panel 10 means displacement of the panel 10 in its entirety parallel to the Z-axis without any change of direction. On the other hand, when the user contacts or presses the panel 10, because the panel 10 attempts to shift with a rotational motion component, vibration at the pressing position on the panel 10 may be inhibited. As such, in the tactile sensation providing apparatus 6 according to the present embodiment, the weights 50 are provided to suppress inhibition of the vibration of the panel 10 by reducing the rotational motion component of the panel 10. Especially in a configuration as the configuration of the tactile sensation providing apparatus 6 in which the panel 10 longitudinally vibrates, the weights 50 suppress the inhibition of the vibration by reducing the rotational motion component about the line orthogonal to the normal of the panel 10.

As illustrated in FIG. 8A, in the tactile sensation providing apparatus 6, similarly to the tactile sensation providing apparatus 120 described with reference to FIGS. 3A to 3C, the actuator 30 configured to vibrate the panel 10 is arranged in the vicinity of each center of the transverse sides of the panel 10. In this configuration, when the user presses a position P2 illustrated in FIG. 8A, the panel 10 moves not only with translational motion in the Z-axis direction, but also with the rotational motion component about a straight line orthogonal to the normal of the panel 10, i.e., the Y-axis. FIG. 8B is a diagram illustrating a state in which the panel 10 of FIG. 8A shifts with the rotational motion component. Note that the movement of the panel 10 is slightly exaggerated in FIG. 8B for the purpose of explanation, and does not reflect an actual shift amount of the movement.

As illustrated in FIG. 8B, when the actuator 30 is driven and expands in the positive Z-axis direction, a force F is applied to the panel 10. The force F causes the panel 10 to move in translational motion in the positive Z-axis direction. When the actuator 30 expands in the positive Z-axis direction while the position P2 is pressed on the panel 10, the panel 10 shifts with the rotational motion to rotate clockwise as illustrated in FIG. 8B. According to the present embodiment, as such, the mass of the weights 50A and 50B is utilized to generate a force to reduce the rotational motion component of the panel 10. According to the present embodiment, in this way, the weights 50A and 50B suppress inhibition of the vibration by reducing the inhibition of the translational motion of the panel 10. To that end, the weights 50A and 50B are preferably arranged in positions where the weights 50A and 50B may reduce the rotational motion component of the panel 10, typically in positions of the weights 50A and 50B as illustrated in FIGS. 8A and 8B.

Next, preferable positions of the weights 50A and 50B on the panel 10 according to the present embodiment will be further described.

As illustrated in FIG. 8B, U represents the expansion amount of the actuator 30 in the positive Z-axis direction when driven. As described above, when the actuator 30 is driven and expands in the positive Z-axis direction while the position P2 is pressed on the panel 10, the panel 10 moves with translational motion in the positive Z-axis direction and, also, shifts with the rotational motion component about the straight line orthogonal to the Z-axis (i.e., the Y-axis). As illustrated in FIG. 8B, Uf represents a shift amount of the position P2 on the panel 10 in the positive Z-axis direction caused by the expansion of the actuator 30. As the value of Uf approaches U, the displacement in the positive Z-axis direction becomes less attenuated, thus efficiently providing a tactile sensation. According to the present embodiment, as such, the weights 50A and 50B are preferably arranged in positions where torque T applied to the panel 10 in the pressing position P2 takes a large value such that the value of Uf approaches U.

Assuming that the magnitude of the moment of inertia of the panel 10 and the weights 50A and 50B is I and the angular acceleration about the rotational axis of the rotational motion of the panel is α, the torque T applied to the panel 10 satisfies a relation expressed by a formula (5) below.

[Formula 5]

$$T = I\alpha \qquad (5).$$

The angular acceleration α in the formula (5) may be expressed by a formula (6) below, provided that ω represents an angular velocity about the rotational axis of the panel 10, and θ represents a displacement angle generated by the rotation of the panel 10.

[Formula 6]

$$\alpha = \frac{d\omega}{dt} = \frac{d^2\theta}{dt^2} \quad (6)$$

The angular acceleration α in the formulas (5) and (6) may also be expressed by a formula (7) provided below. In formula (7), at represents the magnitude of linear tangential acceleration (acceleration in a tangential direction) of the rotational motion of the panel 10, and s represents a distance between the rotary axis of the rotational motion of the panel 10 and the position P2 pressed on the panel 10.

[Formula 7]

$$\alpha = \frac{\alpha t}{s} \quad (7)$$

From the above formulas (5) and (7), the torque T applied to the panel 10 may be expressed by the following formula (8).

[Formula 8]

$$T = I\frac{\alpha t}{s} \quad (8)$$

Here, I representing the moment of inertia of the panel 10 having the weights 50A and 50B provided thereto may be expressed by a formula (9) provided below. In the formula (9), m represents mass of each of the weights 50A and 50B, and r represents a distance between the rotary axis of the panel 10 and the weight 50A or the weight 50B.

[Formula 9]

$$I = 2mr^2 \quad (9)$$

From the above formulas (8) and (9), the torque T applied to the panel 10 in the position P2 being pressed may be expressed by the following formula (10).

[Formula 10]

$$T = 2mr^2 \cdot \frac{\alpha t}{s} \quad (10)$$

It can be seen from the above formula (5) that, in order to increase the torque T applied to the panel 10 in the position P2 being pressed, I representing the moment of inertial of the panel 10 having the weights 50A and 50b provided thereto is increased. Especially from the above formula (10), it can be seen that, in order to increase the torque T applied to the panel 10 in the position P2 being pressed, at least one of the mass m and the distance r is increased. Here, for example, when the tactile sensation providing apparatus 6 is applied to a small device such as a mobile terminal, the mass m of the weights 50A and 50B may not be excessively increased. According to the present embodiment, as such, the weights 50A and 50B are preferably arranged in positions which extend the distance r. According to the present embodiment, that is, the weights 50A and 50B are preferably arranged in positions on the panel 10 remote from the rotary axis of the rotational motion of the panel 10. In the tactile sensation providing apparatus 6 illustrated in FIGS. 8A and 8B, the weights 50A and 50B are arranged across the rotary axis of the rotational motion of the panel 10 at or in the vicinity of either end portion of the panel 10, substantially maximizing the distance r.

According to the present embodiment, as described above, the weight 50 and the panel 10 are preferably configured to suppress the reduction in the torque applied to the pressing position on the panel when the panel 10 moves in rotational motion, i.e., to suppress the reduction in the moment of force. Especially, the weight 50 and the panel 10 are preferably configured to suppress the reduction in the moment of inertia when the panel 10 moves in rotational motion. To that end, the weight 50 is preferably arranged at or in the vicinity of the position on the panel 10 with the maximum distance from the axis of the rotational motion of the panel 10. This configuration enables the tactile sensation providing apparatus 6 according to the present embodiment to efficiently provide a favorable tactile sensation even when a small number of actuators are provided.

Seventh Embodiment

Figure 9A:
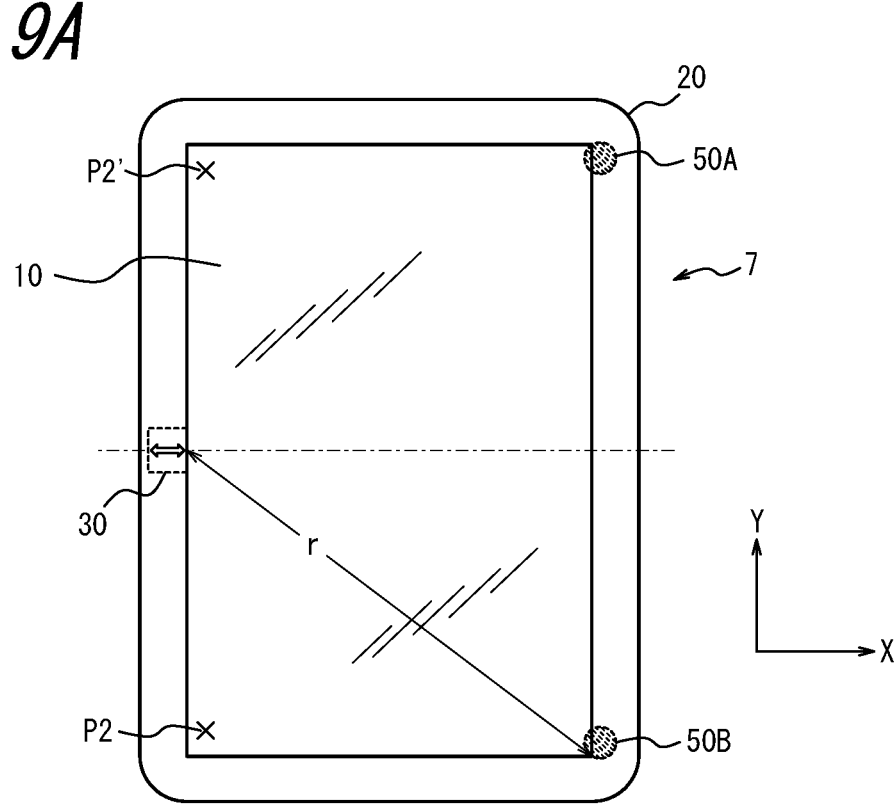
FIGS. 9A and 9B are diagrams illustrating operation of a tactile sensation providing apparatus according to a seventh embodiment.
Figure 9B:
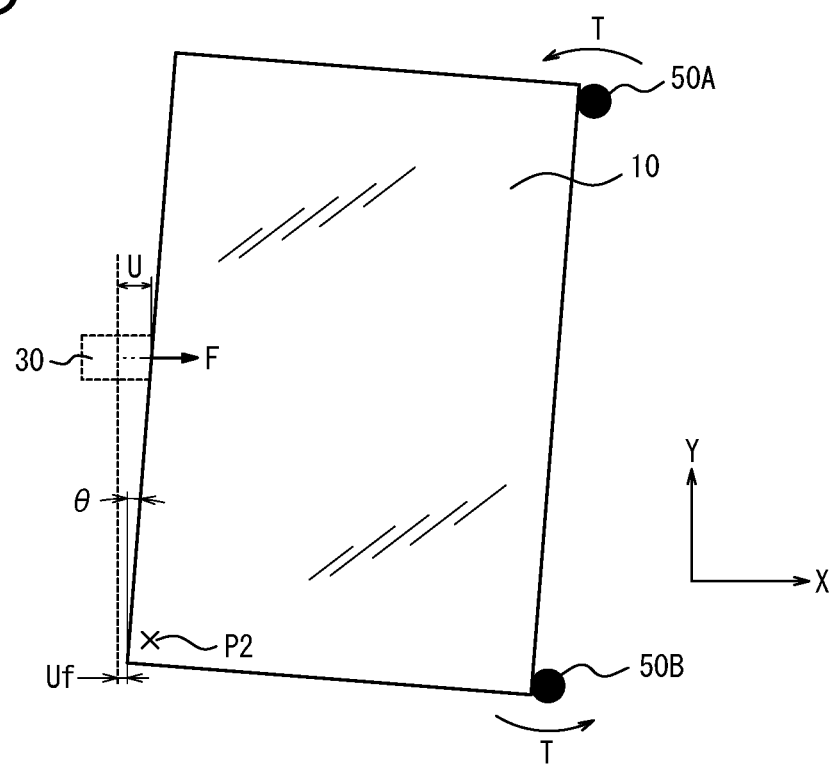

FIGS. 9A and 9B are diagrams illustrating operation of a tactile sensation providing apparatus according to a seventh embodiment of the present disclosure. FIG. 9A is a top view of the tactile sensation providing apparatus 7 according to the seventh embodiment. That is, FIG. 9A is a diagram of the tactile sensation providing apparatus 7 viewed in the negative Z-axis direction.

The tactile sensation providing apparatus 6 according to the sixth embodiment described above causes longitudinal vibration of the panel 10. The tactile sensation providing apparatus 7 according to the seventh embodiment causes the transverse vibration of the panel 10. To the tactile sensation providing apparatus 7 according to the seventh embodiment that causes the transverse vibration of the panel 10, the principle the same as that of the longitudinal vibration of the panel 10 described in the sixth embodiment also applies.

When the tactile sensation providing apparatus 7 illustrated in FIGS. 9A and 9B is not provided with the weights 50A and 50B, the vibration of the actuator 30 is inhibited depending on a contact/pressing position of the user on the panel 10, as described with reference to FIG. 4B. In this case, a favorable tactile sensation may not be provided to the user's finger or the like. For example, when the user contacts or presses a position on a dashed line on the panel 10 illustrated in FIG. 9A, the actuator 30 is capable of directly vibrating the contact/pressing position of the user, successfully providing a favorable tactile sensation. On the other hand, when the user contacts or presses a position P2 illustrated in FIGS. 9A and 9B, the actuator 30 may not directly vibrate the contact/pressing position of the user, thus failing to provide a favorable tactile sensation.

In the configuration illustrated in FIGS. 9A and 9B, when the actuator 30 expands in the positive X-axis direction while the position P2 is being pressed, the panel 10 moves in translational motion in the positive X-axis direction and, also, shifts with the rotational motion component about the Z-axis. Here, the translational motion of the panel 10 means displacement of the panel 10 in its entirety parallel to the X-axis without any change of direction. As such, the tactile sensation providing apparatus 7 according to the present embodiment is provided with the weights 50A and 50B as illustrated in FIGS. 9A and 9B and thus suppresses inhibition of the vibration of the panel 10 by reducing the rotational motion component of the panel 10.

In the tactile sensation providing apparatus 7, when the actuator 30 is driven and expands in the positive X-axis direction, the force F is applied to the panel 10. The force F causes the translational motion of the panel 10 in the positive X-axis direction. When the actuator expands in the positive X-axis direction while the position P2 is pressed on the panel 10, the panel 10 shifts with the clockwise rotational motion about the Z-axis. According to the present embodiment, as such, the mass of the weights 50A and 50B is utilized to generate a force to reduce the rotational motion component of the panel 10. According to the present embodiment, in this way, the weights 50A and 50B suppress inhibition of the vibration by reducing inhibition of the translational motion of the panel 10. To that end, the weights 50A and 50B are preferably arranged at positions where the weights 50A and 50B may reduce the rotational motion component of the panel 10, typically in positions of the weights 50A and 50B as illustrated in FIGS. 9A and 9B. According to the present embodiment, as described above, the weights 50A and 50B suppress inhibition of the vibration by reducing the rotational motion component about the normal of the panel 10 (e.g., the Z-axis).

When a position P2' of the tactile sensation providing apparatus 7 illustrated in FIG. 9A is pressed, the weights 50A and 50B may reduce the clockwise rotational motion component of the panel 10.

In the example of the tactile sensation providing apparatus 7 illustrated in FIGS. 9A and 9B, the weights 50A and 50B are arranged at either end of the right longitudinal side (in the positive X-axis direction) of the panel 10 in such a manner as to increase the distance r between the rotary axis of the panel 10 and the weights 50A and 50B. However, the weights 50A and 50B arranged on either end of the left longitudinal sides (in the negative X-axis direction) of the panel 10 may reduce the rotational motion component of the panel 10 to some degree.

Eighth to Twelfth Embodiment

Figure 10A:
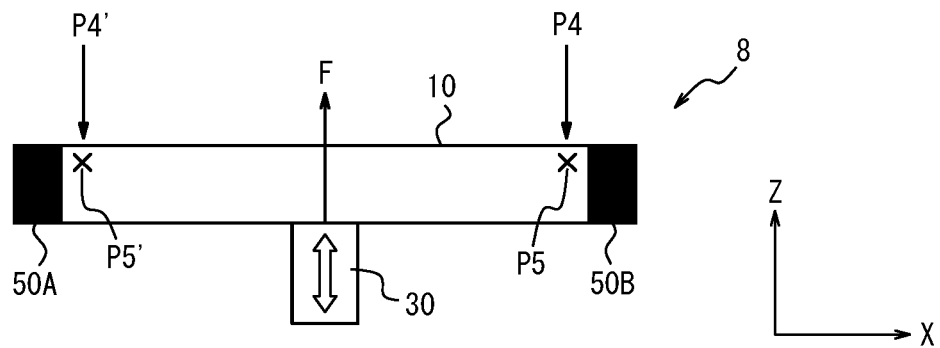
FIG. 10A, FIG. 10B, and FIG. 10C are diagrams respectively illustrating operation of a tactile sensation providing apparatus according to an eighth embodiment, operation of a tactile sensation providing apparatus according to a ninth embodiment, and operation of a tactile sensation providing apparatus according to a tenth embodiment.
Figure 10B:
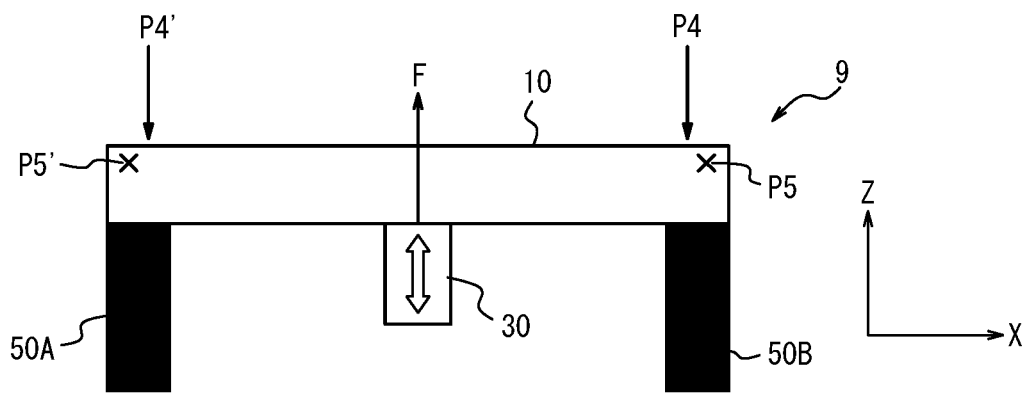
Figure 10C:
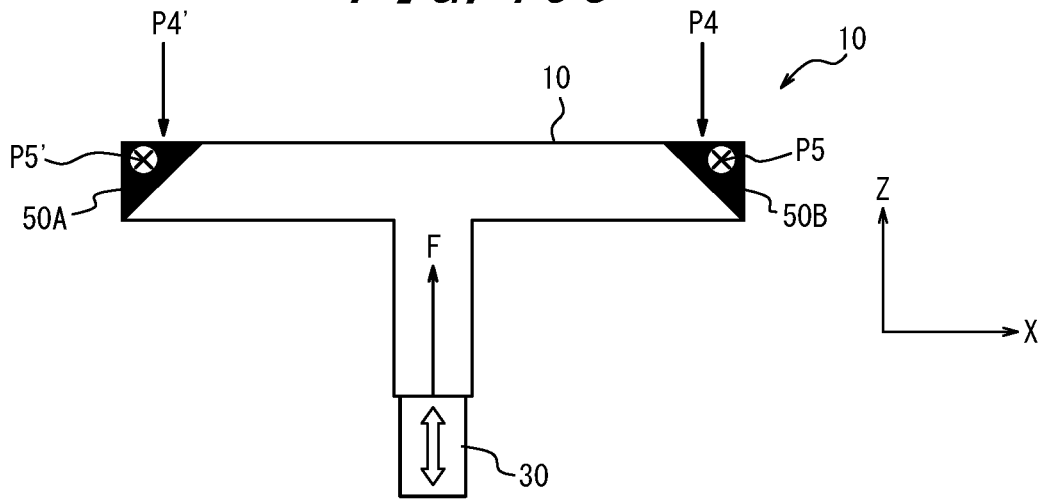

FIGS. 10A to 10C are diagrams illustrating operation of the tactile sensation providing apparatuses according to eighth to tenth embodiments of the present disclosure. FIG. 10A, FIG. 10B, and FIG. 10C respectively illustrate the tactile sensation providing apparatus 8 according to the eighth embodiment, the tactile sensation providing apparatus 9 according to the ninth embodiment, and the tactile sensation providing apparatus 10 according to the tenth embodiment.

To the tactile sensation providing apparatuses 8 to 10 according to the eighth to tenth embodiments illustrated in FIGS. 10A to 10C, the same principles as those of the tactile sensation providing apparatus 6 according to the sixth embodiment described with reference to FIGS. 8A and 8B also apply. Hereinafter, the same descriptions as those of the tactile sensation providing apparatus 6 described with reference to FIGS. 8A and 8B will be appropriately simplified or omitted. First, a case in which the panel 10 longitudinally vibrates in the tactile sensation providing apparatuses 8 to 10 illustrated in FIGS. 10A to 10C will be described. That is, first, a case in which the tactile sensation providing apparatuses 8 to 10 have configurations as illustrated by cross-sectional views in FIGS. 10A to 10C similarly to FIGS. 8A and 8B will be described.

In the configurations as illustrated in FIGS. 10A to 10C, when the actuator 30 expands while the position P4 is being pressed, the panel 10 moves in translational motion in the expansion direction of the actuator 30 and, also, shifts including the rotational motion component. As such, the tactile sensation providing apparatuses 8 to 10 are provided with the weights 50A and 50B as illustrated in FIGS. 10A to 10C, thus suppressing inhibition of the vibration of the panel 10 by reducing the rotational motion component of the panel 10. In the tactile sensation providing apparatuses 8 to 10, the weights 50A and 50B are provided to the panel 10 in such a manner as to increase the distance r between the rotary axis of the panel 10 and the weights 50A and 50B. Similarly to the tactile sensation providing apparatus 6 illustrated in FIGS. 8A and 8B, also, when a position P4' is pressed in the tactile sensation providing apparatuses 8 to 10 illustrated in FIGS. 10A to 10C, the weights 50A and 50B suppress inhibition of the vibration of the panel 10 by reducing the rotational motion component of the panel 10.

The tactile sensation providing apparatuses 8 to 10 in which the panel 10 longitudinally vibrates have been described above. However, the tactile sensation providing apparatuses 8 to 10, similarly to the tactile sensation providing apparatus 7 according to the seventh embodiment, may operate similarly when the panel 10 transversely vibrates. In this case, similarly to FIGS. 9A and 9B, FIGS. 10A to 10C should be considered as illustrating top views of the tactile sensation providing apparatuses 8 to 10, respectively.

In the configurations illustrated in FIGS. 10A to 10C, for example, when the actuator 30 expands while a position P5 is being pressed, the panel 10 moves in translational motion in the expansion direction of the actuator 30 and, also, shifts with the rotational motion component. In the tactile sensation providing apparatuses 8 to 10, as such, the weights 50A and 50B are provided to suppress inhibition of the vibration of the panel 10 by reducing the rotational motion component of the panel 10. Also, in a state in which a position P5' illustrated in FIGS. 10A to 10C is pressed, the weights 50A and 50B are capable of suppressing inhibition of the vibration of the panel 10 by reducing the rotational motion component of the panel 10. As described above, the tactile sensation providing apparatuses 8 to 10 according to the present embodiments may efficiently provide a favorable tactile sensation even when a small number of actuators are provided thereto.

Figure 11A:
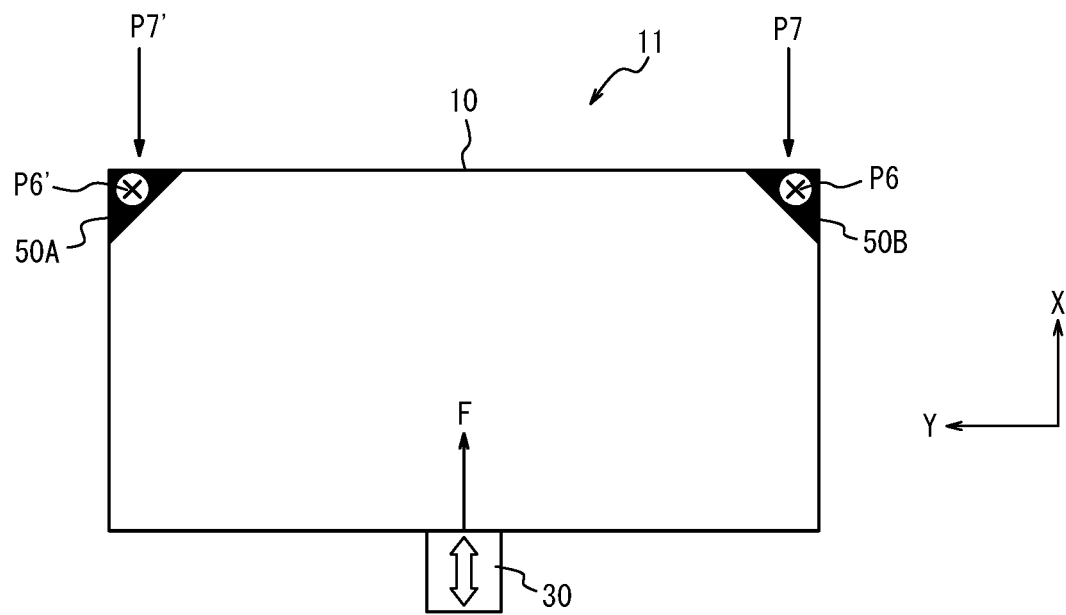
FIG. 11A and FIG. 11B are diagrams respectively illustrating operation of a tactile sensation providing apparatus according to an eleventh embodiment and operation of a tactile sensation providing apparatus according to a twelfth embodiment.
Figure 11B:
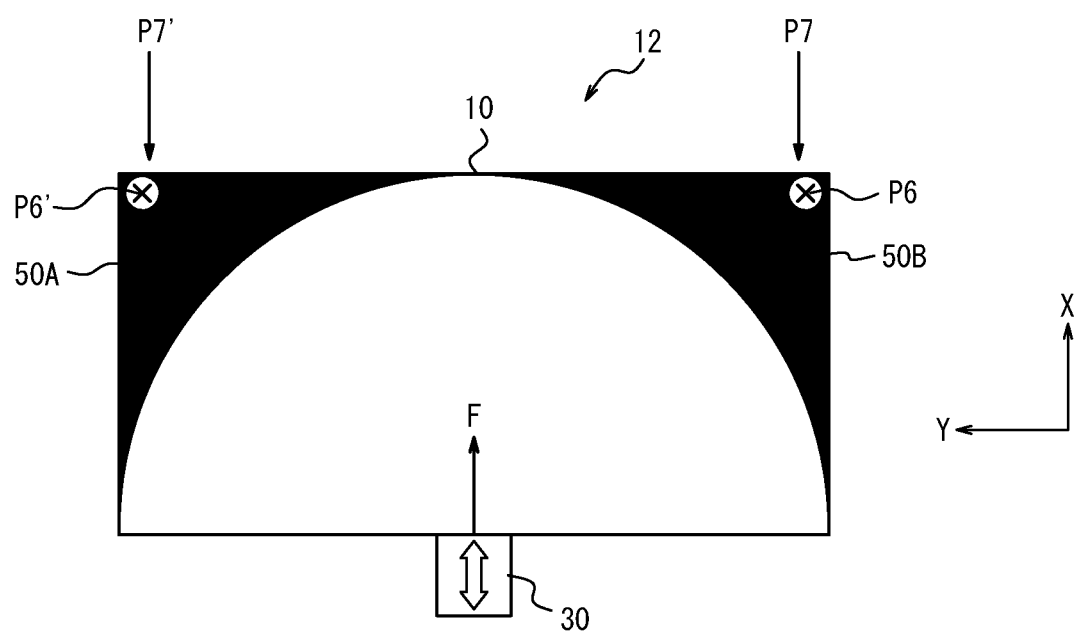

FIGS. 11A and 11B are diagrams illustrating operation of the tactile sensation providing apparatuses according to eleventh and twelfth embodiments of the present disclosure. FIG. 11A and FIG. 11B illustrate the tactile sensation providing apparatus 11 according to the eleventh embodiment and the tactile sensation providing apparatus 12 according to the twelfth embodiment, respectively.

To the tactile sensation providing apparatuses 11 and 12 according to the eleventh and twelfth embodiments illustrated in FIGS. 11A and 11B, the same principle as that of the tactile sensation providing apparatus 7 according to the seventh embodiment described with reference to FIGS. 9A and 9B is also applicable. Hereinafter, the same descriptions as those of the tactile sensation providing apparatus 7 described with reference to FIGS. 9A and 9B will be appropriately simplified or omitted. First, the tactile sensation providing apparatuses 11 and 12 illustrated in FIGS. 11A and 11B in which the panel 10 longitudinally vibrates will be described. That is, first, a case in which FIGS. 11A and 11B illustrate top views of the tactile sensation providing apparatuses 11 and 12 similarly to FIGS. 9A and 9B will be described.

In the configurations illustrated in FIGS. 11A and 11B, when the actuator 30 expands while a position P6 is being pressed, the panel 10 moves in translational motion in the expanding direction of the actuator 30 and, also, shifts with the rotational motion component. As such, the tactile sensation providing apparatuses 11 to 12 are provided with the weights 50A and 50B as illustrated in FIGS. 11A and 11B, thus suppressing inhibition of the vibration of the panel 10 by reducing the rotational motion component of the panel 10. In the tactile sensation providing apparatuses 11 and 12, the weights 50A and 50B are provided to the panel 10 in such a manner as to increase the distance r between the rotary axis of the panel 10 and the weights 50A and 50B. In a similar manner to the tactile sensation providing apparatus 7 illustrated in FIGS. 7A to 7C, when a position P6' is pressed in the tactile sensation providing apparatuses 8 to 10 illustrated in FIGS. 11A and 11B, the weights 50A and 50B suppress inhibition of the vibration of the panel 10 by reducing the rotational motion component of the panel 10.

The tactile sensation providing apparatuses 11 and 12 in which the panel transversely vibrates have been described above. However, tactile sensation providing apparatuses 11 and 12, in a manner similar to the tactile sensation providing apparatus 6 according to the sixth embodiment, may operate when the panel 10 vibrates longitudinally. In this case, in a manner similar to FIGS. 8A and 8B, FIGS. 11A and 11B should be considered as illustrating cross-sectional views of the tactile sensation providing apparatuses 11 and 12, respectively.

In the configurations illustrated in FIGS. 11A and 11B, for example, when the actuator 30 expands while a position P7 is being pressed, the panel 10 moves in translational motion in the expansion direction of the actuator 30 and, also, shifts with the rotational motion component. As such, the tactile sensation providing apparatuses 11 and 12 are provided with the weights 50A and 50B for suppressing inhibition of the vibration of the panel 10 by reducing the rotational motion component of the panel 10. Also, in a state in which a position P7' illustrated in FIGS. 11A and 11B is pressed, the weights 50A and 50B suppress inhibition of the vibration of the panel 10 by reducing the rotational motion component of the panel 10. As described above, the tactile sensation providing apparatuses 11 and 12 according to the present embodiments may efficiently provide a favorable tactile sensation even when a small number of actuators are provided thereto.

Although the present disclosure has been described on the basis of the figures and the embodiments, it is apparent that various modifications and changes may be readily implemented by those who are ordinarily skilled in the art. Accordingly, such modifications and changes are included in the scope of the present disclosure. For example, a function and the like included in each element, each means, or each step can be rearranged without a logical inconsistency, such that a plurality of elements or steps are combined or divided. Further, each embodiment of the present disclosure presented above is not limited to strictly following the description but may be implemented by appropriately combining or omitting features.

REFERENCE SIGNS LIST 1, 2, 3, 4, 5, 6, 7, 8, 9, 10, 11, 12 tactile sensation providing apparatus
10 panel
20 housing
22, 22a, 22b support
30, 30a, 30b, 30c, 30d actuator
40, 40A, 40B elastic member
50, 50A, 50B weight

The invention claimed is:

1. A tactile sensation providing apparatus comprising:
   a panel;
   an actuator configured to vibrate the panel; and
   a weight provided to the panel,
   wherein, when the actuator vibrates the panel, the weight suppresses inhibition of vibration at a position where the panel is pressed, and
   wherein the weight suppresses the inhibition of vibration by reducing a rotational motion component of the panel.

2. The tactile sensation providing apparatus according to claim 1,
   wherein, when the panel is not pressed, the actuator vibrates the panel by causing a translational motion of the panel.

3. The tactile sensation providing apparatus according to claim 1,
   wherein the weight suppresses the inhibition of vibration by reducing the rotational motion component about an axis normal to the panel.

4. The tactile sensation providing apparatus according to claim 1,
   wherein the weight suppresses the inhibition of vibration by reducing the rotational motion component about an axis orthogonal to the normal of the panel.

5. The tactile sensation providing apparatus according to claim 1,
   wherein the weight is provided at or in the vicinity of a position on the panel having a maximum distance from an axis of a rotational motion of the panel.

* * * * *